Feb. 20, 1934.  J. E. JEWETT  1,947,851
MIXING APPARATUS
Filed Jan. 31, 1930   2 Sheets-Sheet 1
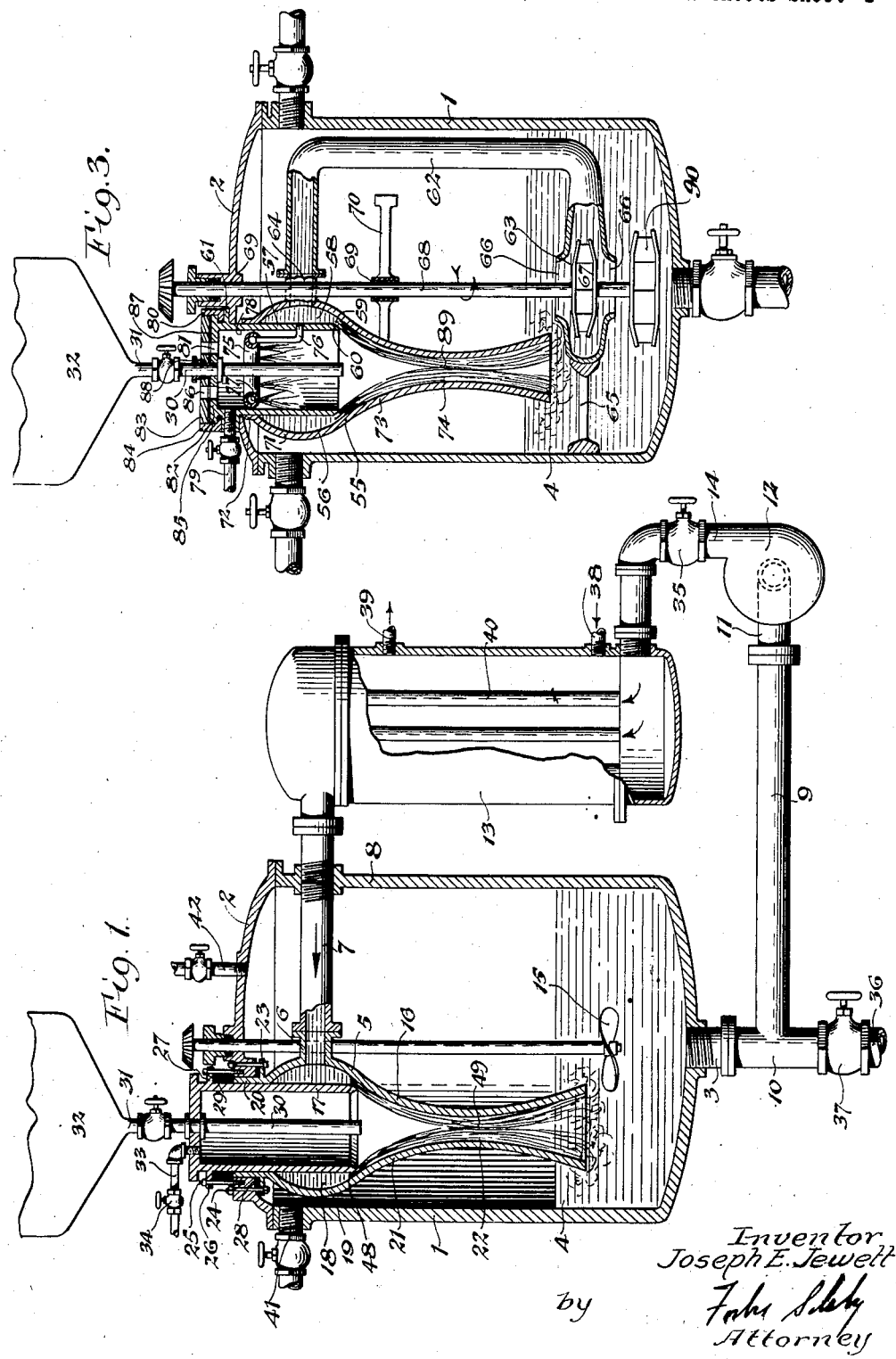
Inventor
Joseph E. Jewett
by
Attorney Feb. 20, 1934.  J. E. JEWETT  1,947,851
MIXING APPARATUS
Filed Jan. 31, 1930  2 Sheets-Sheet 2
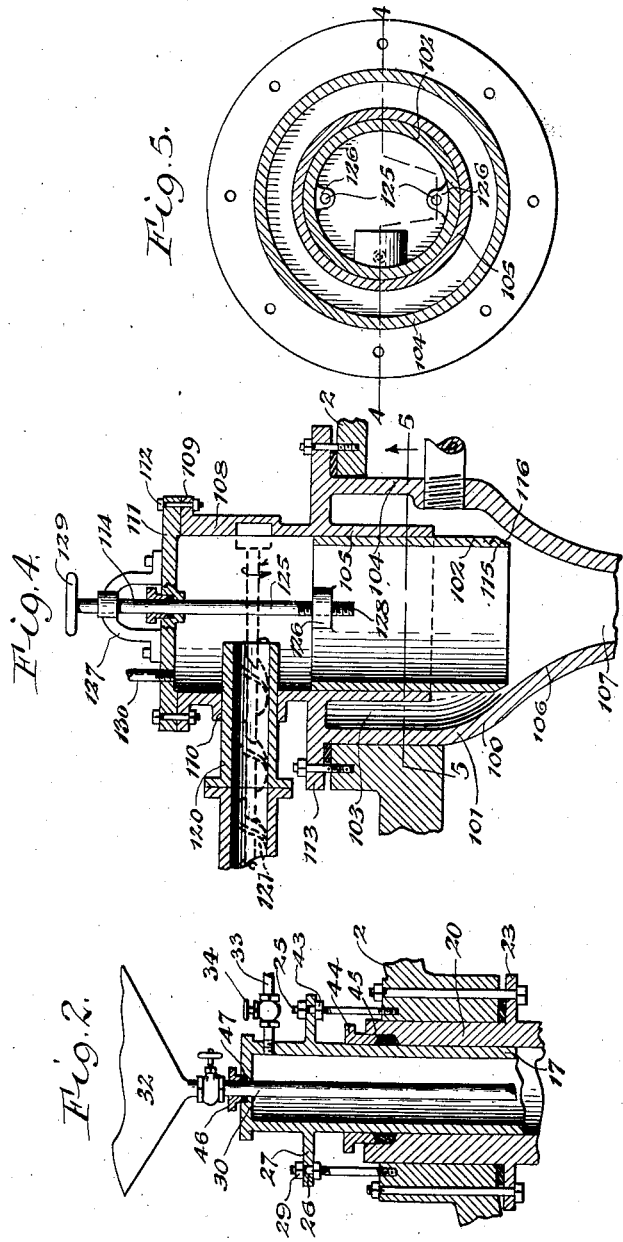

Patented Feb. 20, 1934

1,947,851

UNITED STATES PATENT OFFICE 1,947,851

MIXING APPARATUS

Joseph E. Jewett, Buffalo, N. Y., assignor to National Aniline and Chemical Company, Inc., New York, N. Y., a corporation of New York Application January 31, 1930. Serial No. 424,911

8 Claims. (Cl. 259—95)

This invention relates to mixing apparatus, and more particularly to apparatus for mixing chemically reacting ingredients. It relates specifically to apparatus for mixing material, in the form of a liquid or of a comminuted solid, with a material in liquid condition or in admixture with a liquid.

In the manufacture of chemical products, processes are employed in which the reacting ingredients are required to be rapidly and intimately mixed. It frequently happens in practice that side reactions and decomposition occur, due to incomplete mixing of the reacting ingredients, which cause a loss in yield of the product. Some processes, moreover, require that the reaction be conducted in the absence of air or in the presence of an atmosphere of a particular gas. Other reactions require careful control of the temperature.

An object of the present invention is to provide an apparatus for mixing chemically reacting ingredients whereby rapid and effective mixing may be obtained.

Another object of the invention is to provide an apparatus for mixing materials whereby material, either in the form of a liquid or of a comminuted solid, may be rapidly and intimately mixed with another material in liquid condition or in admixture with a liquid.

A further object of the invention is to provide an apparatus for mixing chemically reacting ingredients whereby one ingredient, either in the form of a liquid or of a comminuted solid, may be rapidly and intimately mixed with another ingredient in liquid condition or in admixture with a liquid while controlling the temperature of the reaction mixture.

An additional object of the invention is to provide an apparatus for mixing chemically reacting ingredients whereby one ingredient may be rapidly and intimately mixed with another ingredient in liquid condition or in admixture with a liquid while maintaining an atmosphere of a gas in contact with the mixture.

Other objects of the invention will in part be obvious and will in part appear hereinafter.

With the above mentioned ends in view, the present invention comprises the novel features of construction, combination of elements, and arrangement of parts exemplified in the following detailed disclosure and illustrated in the accompanying drawings. The scope of the invention will be indicated in the claims.

In the practice of the present invention, the objects thereof are accomplished by providing an apparatus which comprises a mixing vessel for mixing material with a moving stream of liquid, the said mixing vessel having means for spreading the moving liquid into the form of a hollow figure, preferably a cone, and means for introducing material in the form of a liquid or comminuted solid into the hollow of the figure of liquid. Means for maintaining a partial vacuum in the mixing vessel, means for regulating the temperature of the circulating liquid, and means for maintaining an atmosphere of gas in the mixing vessel also may be provided.

For a fuller understanding of the nature and objects of the invention reference should be had to the following detailed description taken in connection with the accompanying drawings in which—

Figure 1 is a sectional view of one form of apparatus embodying the invention,

Figure 2 is a fragmentary section of a form of mixing vessel showing one form of adjusting means, Figure 3 is a sectional view of a modified form of apparatus embodying the invention, Figure 4 is a fragmentary section of a modified form of mixing vessel, and Figure 5 is a sectional view of the mixing vessel shown in Figure 4 taken along the line 5—5 of Figure 4.

Referring to the drawings, 1 is a closed tank having a cover 2 and a bottom outlet 3, and adapted to contain a liquid 4.

In the embodiment shown in Figure 1, a mixing vessel 5, suitably supported within the upper portion of the tank 1, as for example from the cover 2, has a side connection 6 to a pipe 7 passing into the tank 1 through its side wall 8. A pipe 9, joined to the bottom outlet 3 by a T 10 leads to the intake 11 of a circulating pump 12. A tubular cooler 13 connects the pipe 7 to the discharge 14 of the circulating pump 12. 15 is an agitator for stirring the liquid 4.

The mixing vessel 5 comprises an outer shell 16 and an inner hollow cylinder 17 forming a chamber 18. The outer shell 16 is in the form of a bulb having a substantially spherical midportion 19, an outer cylindrical collar portion 20, and a depending tapered conical portion 21, forming a Venturi throat 22. The cylinder 17 and the collar portion 20 are so constructed that a close sliding fit is obtained. The cylinder 17 is of a larger diameter than the tapered conical portion 21 of the shell 16, and extends outward beyond the collar portion 20.

A flange 23 on the collar 20 of the shell 16 supports the mixing vessel 5 from the cover 2 to which it is secured by suitable means, shown as bolts 24. A suitable packing 28 is placed between the flange 23 and the cover 2. Stud bolts 25 mounted on the cover 2 in cooperating relation with openings 26 in a flange 27 on cylinder 17, and nuts 29 complete the means for securing the cylinder 17 within the shell 16.

A pipe 30 axially located within the cylinder 17, and connected to the valved bottom outlet 31 of the tank 32, serves to introduce material into the mixing vessel 5. A pipe 33 having a valve 34 permits the admission of air or other gases to the interior of the cylinder 17.

A valve 35 controls the flow of liquid through the circulating system, and an outlet pipe 36, connected to the T 10 and having a valve 37, is provided for emptying the tank 1.

Pipes 38 and 39 provide for the circulation of cooling liquid around the tubes 40 of the cooler 13. A valved pipe 41 provides an inlet to the tank 1, and a valved pipe 42 provides a vent for gases and vapors.

A modified form of mounting for the cylinder 17 whereby it may be adjusted relatively to the shell 16 is shown in Figure 2 of the drawings. This consists of the stud bolts 25 cooperating with the openings 26 in the flange 27, as above described, nuts 43 on the stud bolts 25 between the flange 27 and cover 2, and nuts 29. A gland 44 fitting into a recess 45 in the collar 20, and a gland 46 fitting into a recess 47 in the outer end of cylinder 17, provide stuffing boxes for the cylinder 17 and pipe 30, respectively. Adjustment of the nuts 43 and 29 on the bolt 25 enables longitudinal adjustment of the cylinder 17 with respect to the shell 16, thereby permitting a variation of the size of the annular passage 48 between the tapered inner end of the cylinder 17 and the inner wall of the shell 16.

A modification of the apparatus, in which the circulating system is contained within the tank 1, is shown in Figure 3 of the drawings.

In this figure, the mixing vessel 55, which comprises the outer shell 56 suitably secured as by welding to the inner hollow cylinder 57 to form a chamber 58 and leaving an annular passage 59 between the tapered inner end 60 of the cylinder 57 and the inner wall of the shell 56, is suitably supported from the cover 2, as by a flange 61 formed on the cylinder 57, and suitable bolts. A pipe 62 within the tank 1 and leading from a submerged centrifugal pump 63 to a side connection 64 of the mixing vessel 55 serves to supply liquid from the body of liquid 4 in the tank 1 to the chamber 58 of the mixing vessel. A pipe 30 serves to connect the valved outlet 31 of a container 32 to the mixing vessel 55.

The pump 63, which is supported by brackets 65 suitably secured to the inner wall of the tank 1, is shown as having a double intake 66. A single intake pump may also be employed, however, if desired. The rotor 67 of the pump 63 and an agitator 90 are mounted on a rotatable shaft 68 journalled in bearings 69, which are mounted in the cover 2 and a spider 70, respectively.

The outer shell 56 is similar to the shell 16 of the apparatus illustrated in Figure 1 of the drawings, and comprises a substantially spherical mid-portion 71, a cylindrical collar portion 72, and a depending tapered conical portion 73, forming a Venturi throat 74. A spray ring 75, secured within cylinder 57 and connected by a pipe 76 with the chamber 58, has spray-openings 77 for supplying a spray of liquid against the inner wall 78 of the cylinder 57. A valved pipe 79 permits the addition of air or other gases to the interior of the cylinder 57.

An additional means for admitting gas into the interior of cylinder 57 comprises a rotatable cap 80 adapted to cover openings 81 in the outer end 82 of the cylinder 57. The cap 80 is formed of a plate portion 83 and a ring portion 84 which are adapted to screw one into the other and enclose between them a flange 85 formed on the outer end 82 of the cylinder 57. The cap 80 also has openings 86 which are adapted upon rotation of the cap to register with the openings 81. Suitable packing 87 and a gland 88 form a seal for the cap.

In the modified form of mixing vessel illustrated in Figures 4 and 5 of the drawings, the mixing vessel 100 comprises an outer shell 101 and an inner cylindrical sleeve 102 forming an annular chamber 103.

The outer shell 101 comprises a cylindrical mid-portion 104, having an inner cylindrical lip 105, spaced from the interior wall of said mid-portion 104, and forming a guide for the sleeve 102; an inner tapered conical portion 106, forming a Venturi throat 107; an outer cylindrical collar portion 108, having a flanged edge 109 and a side wall opening 110; and a cover plate 111 secured to the flange 109, for example, by bolts 112.

A flange 113 on the shell 101 supports the mixing vessel from the cover 2.

The sleeve 102 and the lip 105 are so constructed that a close sliding fit is obtained, and means 114 are provided for adjustably supporting the sleeve 102 from the cover 111. The sleeve 102 is of a larger diameter than the tapered conical portion 106 of the shell 101, and is tapered at its inner edge 115 to conform to the taper of said conical portion, forming an annular passage 116 between the inner edge 115 of the sleeve 102 and the interior wall of the shell 101.

A conveyor tube 120 carrying a screw conveyor 121, projects into the interior of the mixing vessel 100 through the opening 110 in the collar portion of the shell 101, and serves to introduce solid material into said mixing vessel. Air or other gas may be introduced by means of a pipe 130.

The adjustable means 114 for supporting the collar 102 may be any suitable mechanism. It is shown in the drawings as two rotatable spindles 125 cooperating with lugs 126 formed on the interior wall of the sleeve 102, diametrically opposite to each other. Each spindle 125 is journalled in a yoke 127, which is mounted on the coverplate 111, and which prevents the spindle from moving longitudinally. The inner end 128 of each spindle 125 is threaded to engage correspondingly threaded openings in lugs 126. Hand wheels 129 are provided for operating the spindles. This mechanism provides for longitudinal adjustment of the sleeve 102 within the shell 101, and accordingly enables the clearance between the end 115 of the sleeve and the interior wall of the shell 101 (that is, the width of the annular passage 116) to be controlled.

The operation of the apparatus above described will be illustrated in connection with the mixing and quenching of a normally solid material in molten condition with a relatively larger body of diluting or quenching liquid, but it will be understood that the apparatus is not limited thereto and may be employed for mixing a liquid and/or a solid (or a mixture thereof with a gas) with a liquid.

Referring to the apparatus exemplified in Figure 1 of the drawings, tank 1 is filled with a quantity of diluting or quenching liquid 4 (e. g., water) until at least the outlet from the Venturi throat 22 of the mixing vessel 5 is submerged. The pump 12 is then put into operation, and the liquid is circulated from the body of liquid 4 through the pipe 9, cooler 13, pipe 7 and mixing vessel 5, back to the body of liquid 4.

The liquid in passing through the mixing vessel 5 is formed into a hollow cone 49 by the action of the cylinder 17 and the Venturi throat 22, the thickness of the wall of the cone 49 depending upon the width of the annular passage 48.

When circulation of a stream of liquid through the system has been established, the valve in the outlet 31 leading from the tank 32, which contains the normally solid material in molten condition (e. g., molten caustic alkali), is opened and the liquefied solid material is passed into the interior of the hollow cone of liquid 49. The turbulence caused by the circulation of the liquid through the Venturi throat 22 produces rapid mixing of the liquid and solid material. If the solid material is soluble in the liquid, solution is aided by the agitation, and if it is insoluble in the liquid, dispersion of the solid in the liquid is produced. Further mixing of the solid material with the liquid is produced by the agitator 15.

Control of the temperature of the diluting or quenching liquid may be effected, if desired, by means of the cooler 13. A blanket of gas may also be maintained in the mixing vessel 5 by admitting the gas into the interior of cylinder 17 through pipe 33. When a gas is employed, the suction produced by the Venturi throat 22 on the gas will draw it down into the body of liquid 4. Additional suction on the gas may also be imposed by connecting the vent 42 to a vacuum pump. The gas in passing through the body of liquid 4 will also assist in agitating it.

The apparatus may also be employed for the treatment of a liquid with another liquid to form a mixture thereof followed by the treatment of the mixture with a gas. Such an operation will be described in connection with the embodiment of the invention exemplified in Figure 3 of the drawings.

A liquid is circulated from a body of the liquid 4 through pipe 62 and mixing vessel 55 back to the body of liquid 4 by means of pump 63. When circulation is established, another liquid contained in tank 32 is admitted through pipe 30 into the interior of the mixing vessel 55 where it mixes with the first mentioned liquid.

As explained in connection with the embodiment of the invention above described, a hollow cone 89 of the first mentioned liquid is produced in the mixing vessel, and the introduction of the second mentioned liquid into the hollow in the cone of liquid 89 results in intimate mixture thereof. Liquid which is splashed onto the interior wall 78, of the cylinder 57 is washed down into the cone 89 by liquid from the spray-ring 75. Circulation of the liquid and the resulting mixture is continued until all of the second mentioned liquid has been added and complete intermixture has been obtained.

When intermixture of the two liquids has been completed, circulation of the liquid mixture is continued without interruption, and a gas is admitted into the mixing vessel 55, either through pipe 79 or openings 81 and 86, or preferably through both. The Venturi suction produced as a result of the circulation of the liquid mixture draws the gas down into the liquid mixture with which it becomes effectively mixed.

The intermixture of a solid material in comminuted form with a liquid also may be effected by means of the embodiment of the invention hereinabove just described, or it may be brought about by means of a mixing vessel such as is exemplified in Figures 4 and 5 of the drawings, the operation of which will be evident in view of the foregoing disclosure.

It will be realized that the invention is not limited to the apparatus and the details thereof above set forth. Thus, the circulating system or any part thereof may be either contained within the tank 1 or may be placed exteriorly thereof. Other forms of circulating and cooling means may be employed. The agitator and the rotor of the circulating pump shown in Figure 3 of the drawings may be on a single shaft, as described, or they may be on separate shafts having separate drives.

Other means for forming the circulating liquid into a hollow cone may be employed and the mixing vessel may have other forms than those illustrated. A mixing vessel of the type hereinbefore exemplified is preferred, however. A Venturi throat may or may not be included as a part of the mixing vessel. Its inclusion is preferred, however, because the suction produced by it increases the velocity of the liquid in the mixing vessel, increases the turbulence produced by the circulating stream of liquid at its junction with the main body of liquid, and aids, when gas is present in the mixing vessel, in drawing the gas into the main body of liquid. The inner wall of the mixing vessel which has been illustrated as a cylindrical member may have a different form and may be adjustable relatively to the outer member or not. An adjustable inner member is preferred, however, inasmuch as it permits the size of the annular passage in the mixing vessel to be varied, thereby permitting variation of the velocity, thickness and shape of the cone of liquid in the mixing vessel.

The means for feeding the material to be introduced into the moving cone of liquid may be varied to conform to the requirements of the material introduced. A scrubbing means such as the spray-ring 75 may be employed with any of the modifications of the invention above illustrated, and may be fed from an external source and with a liquid different from the circulating liquid. A construction whereby the scrubbing means is fed by the circulating liquid itself, as exemplified in Figure 3 of the drawings, is preferred.

Means for admitting a gas into the interior of the mixing vessel may also be provided for any or all of the mixing vessels above described and said means need not be of the form illustrated in the drawings but may comprise any equivalent thereof.

The apparatus may be employed for carrying out various types of processes in which a solid or liquid is mixed with a liquid, with or without control of the temperature, and in the presence or absence of a gas. The apparatus may also be employed in effecting the intermixture of a liquid and solid, or two liquids, which react to generate a gas as a by-product, in which case the gas which is formed aids in the intermixing of the reacting materials and also in drawing any dust formed by impact of the solid on the moving stream of liquid down into the body of liquid.

Since certain changes in the construction, combination and arrangement of the parts set forth may be made without departing from the scope of the invention, it is intended that all matter contained in the above description and shown in the accompanying drawings shall be interpreted as illustrative, and not in a limiting sense, except as limited by the claims.

I claim:

1. A mixing apparatus comprising a mixing vessel for introducing a solid or liquid into a moving stream of liquid, said mixing vessel including means for forming said moving liquid into a hollow cone, means for circulating a liquid through said mixing vessel, said means including a system for circulating said moving liquid in a cyclic stream, means for maintaining an atmosphere of gas in said mixing vessel, and means for maintaining a reduced pressure in said mixing vessel.

2. A mixing apparatus comprising a mixing vessel for introducing a solid or liquid into a moving stream of liquid, said mixing vessel including means for forming said moving liquid into a hollow figure having a converging outer wall, means for circulating a liquid through said mixing vessel, said means including a system for circulating said moving liquid in a cyclic stream, means for maintaining an atmosphere of gas in said mixing vessel, and means comprising a Venturi pipe for removing said liquid from said mixing vessel and for maintaining a reduced pressure in said mixing vessel.

3. A mixing apparatus comprising a tank for containing a body of liquid; a mixing vessel for mixing material with said liquid; means for passing liquid from said body of liquid in a cyclic stream through said mixing vessel and back to said tank, said means including a centrifugal pump having a rotor mounted in said body of liquid.

4. A mixing apparatus comprising a tank adapted to contain a body of liquid; a mixing vessel in said tank, said mixing vessel including means for forming a stream of liquid into a hollow cone, means for introducing solid or liquid material into said hollow cone, and means for maintaining an atmosphere of gas in contact with said cone of liquid; a Venturi pipe forming an outlet for said mixing vessel and dipping below the surface of said body of liquid; a pipe for feeding a stream of said liquid from said body of liquid to said mixing vessel; a pump for circulating said stream of liquid through said pipe, said pump being submerged below the surface of said body of liquid, and having a rotor mounted on a rotatable shaft; and an agitator mounted on said rotatable shaft.

5. A mixing apparatus comprising a tank adapted to contain a body of liquid; a mixing vessel in said tank, said mixing vessel including means for forming a stream of liquid into a hollow figure, and means for introducing solid or liquid material into the hollow of said figure; and means in said tank for circulating liquid from said body of liquid through said mixing vessel, and back to said body of liquid.

6. A mixing vessel comprising a stationary outer shell, a stationary inner shell forming a liquid chamber with said outer shell, a mixing chamber in said vessel, an annular passage connecting said chambers, means for introducing non-gaseous material into said mixing vessel within said inner shell, and means having communication with said liquid chamber for flowing liquid from said liquid chamber over the interior wall of said inner shell.

7. An apparatus for preparing an admixture of a material with a liquid which comprises a tank for containing liquid, means for forming a moving stream of said liquid into a hollow figure, means for introducing material in the non-gaseous form into the hollow of said figure and a Venturi pipe through which the admixture thus produced passes, said Venturi pipe dipping below the liquid level in said tank.

8. A mixing apparatus comprising a tank adapted to contain a body of liquid; a mixing vessel in said tank, said mixing vessel including means for forming a stream of liquid into a hollow cone, means for introducing solid or liquid material into said hollow cone, and means for maintaining an atmosphere of gas in contact with said cone of liquid; a Venturi pipe forming an outlet for said mixing vessel and dipping below the surface of said body of liquid; a pipe for feeding a stream of said liquid from said body of liquid to said mixing vessel; and a pump for circulating said stream of liquid through said pipe.

JOSEPH E. JEWETT.